Aug. 15, 1944.  R. K. STOUT  2,355,685
WIND SIMULATOR DEVICE FOR GROUND TRAINERS
Filed April 15, 1943  7 Sheets-Sheet 1
Fig. 1.
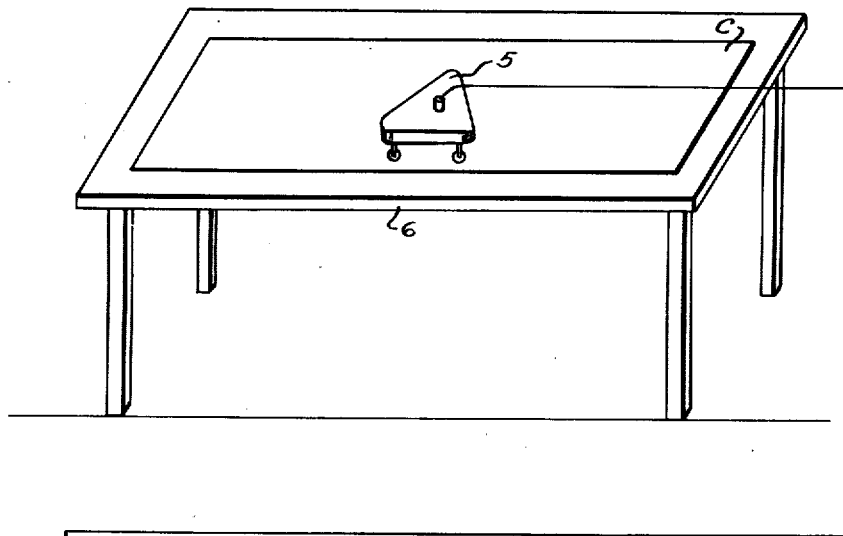
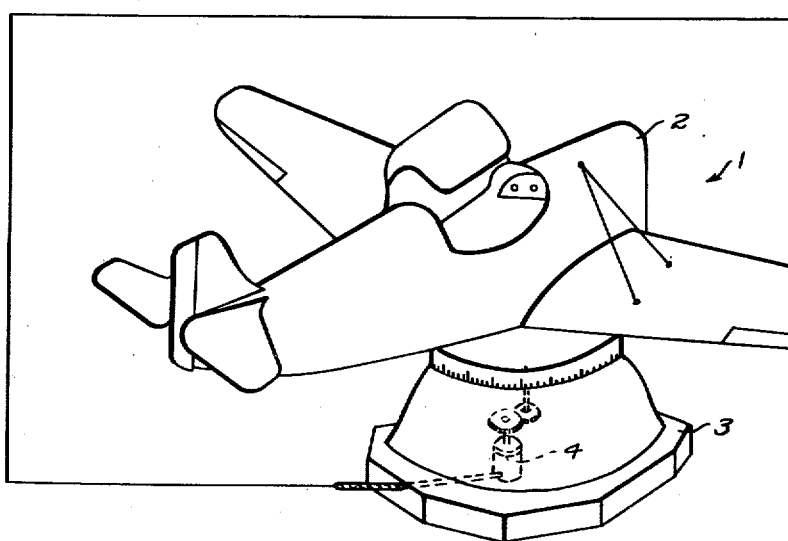
INVENTOR
RAYMOND K. STOUT Aug. 15, 1944.  R. K. STOUT  2,355,685
WIND SIMULATOR DEVICE FOR GROUND TRAINERS
Filed April 15, 1943  7 Sheets-Sheet 3

INVENTOR
RAYMOND K. STOUT
BY
ATTORNEYS

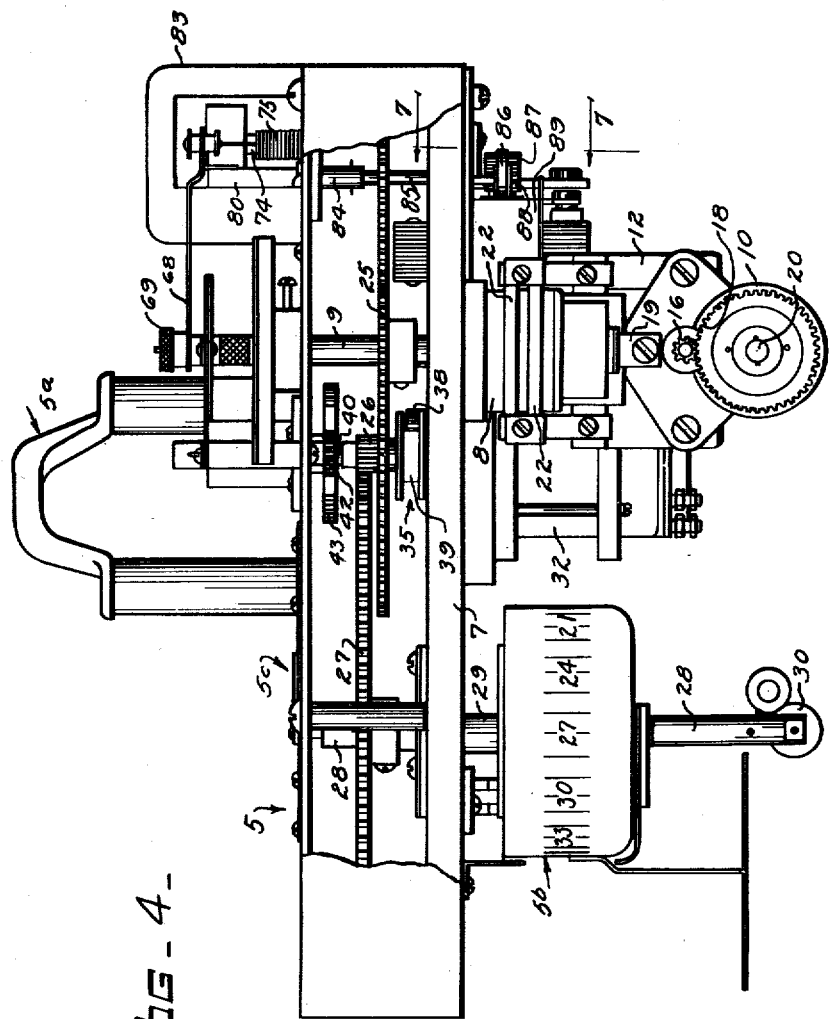

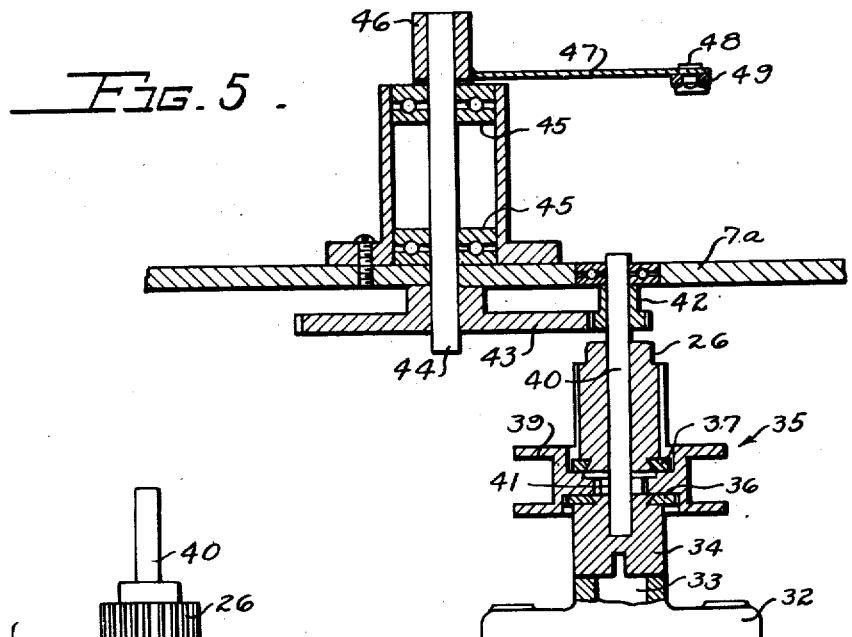
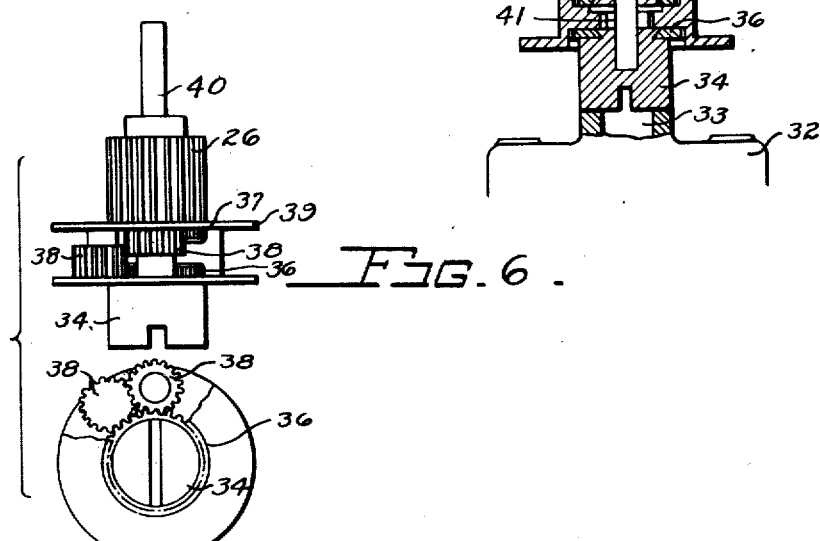
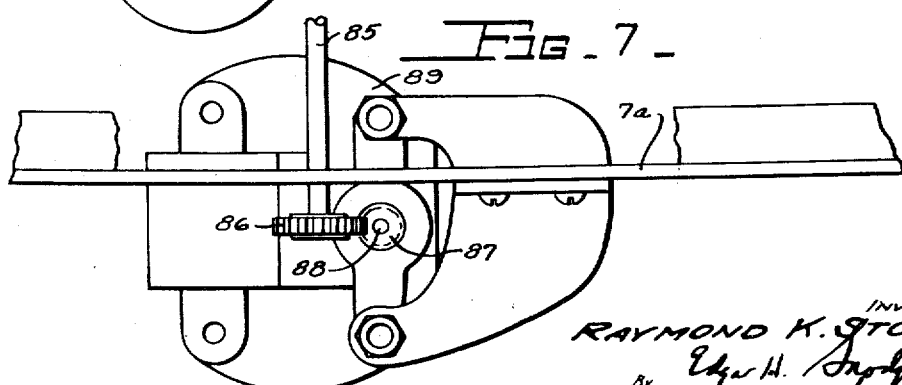

Aug. 15, 1944.    R. K. STOUT    2,355,685
WIND SIMULATOR DEVICE FOR GROUND TRAINERS
Filed April 15, 1943    7 Sheets-Sheet 6

INVENTOR
RAYMOND K. STOUT
BY
ATTORNEYS

INVENTOR
RAYMOND K. STOUT

Patented Aug. 15, 1944

2,355,685

UNITED STATES PATENT OFFICE 2,355,685

WIND SIMULATOR DEVICE FOR GROUND TRAINERS

Raymond K. Stout, Dayton, Ohio

Application April 15, 1942, Serial No. 483,103

9 Claims. (Cl. 35—12)

(Granted under the act of March 3, 1883, as amended April 30, 1928; 370 O. G. 757)

The invention described herein may be manufactured and used by or for Government for governmental purposes, without the payment to me of any royalty thereon.

This invention relates to a device for use in conjunction with an aviation ground trainer and recorder whereby the effect of a simulated wind may be introduced into trainer problems.

I am aware that various proposals have been made for introducing the effect of wind into ground trainer problems such as mounting the recorder on a movable belt so as to displace the recorder bodily in the direction of the assumed wind, or to mount the chart, on which the recorder leaves its record, on a moving table or carriage to thereby obtain the effect of the assumed wind on the trace left by the recorder on the chart. The present invention differs from such prior proposals in that wind simulating effects are introduced directly in the the recorder heading and velocity.

In the well-known link trainer the recorder is directionally controlled in azimuth by an electrical motion transmission which interconnects the recorder steering means with the trainer. In accordance with the present invention means are provided whereby the directional control of the recorder is made responsive to the effective drift angle of an assumed wind as well as the instant heading of the trainer so that the course recorder's heading at any instant is equal to the algebraic sum of the trainer heading and the drift angle. Means are provided for automatically computing the drift angle for any given values of the trainer air-speed, trainer heading, assumed wind heading and wind velocity. Means are also provided in conjunction with the drift computing means for computing the value of the ground speed vector of the wind triangle and for varying the translational velocity of the recorder to correspond to the computed ground-speed vector.

With the above objects and features of the invention in mind, the specific details thereof will become apparent by reference to the detailed description hereinafter given and to the appended drawings in which:

Fig. 1 illustrates the general arrangement of the elements of the invention;

Fig. 4 is a side elevation of the recorder of Fig. 1;

Fig. 5 is a view partly in section illustrating a two-way drive differential as seen on line 5—5 of Fig. 2;

Fig. 6 is a view illustrating the details of the differential of Fig. 5;

Fig. 7 is a view taken on line 7—7 of Fig. 4 illustrating a constant speed interrupter cam drive;

Figure 2:
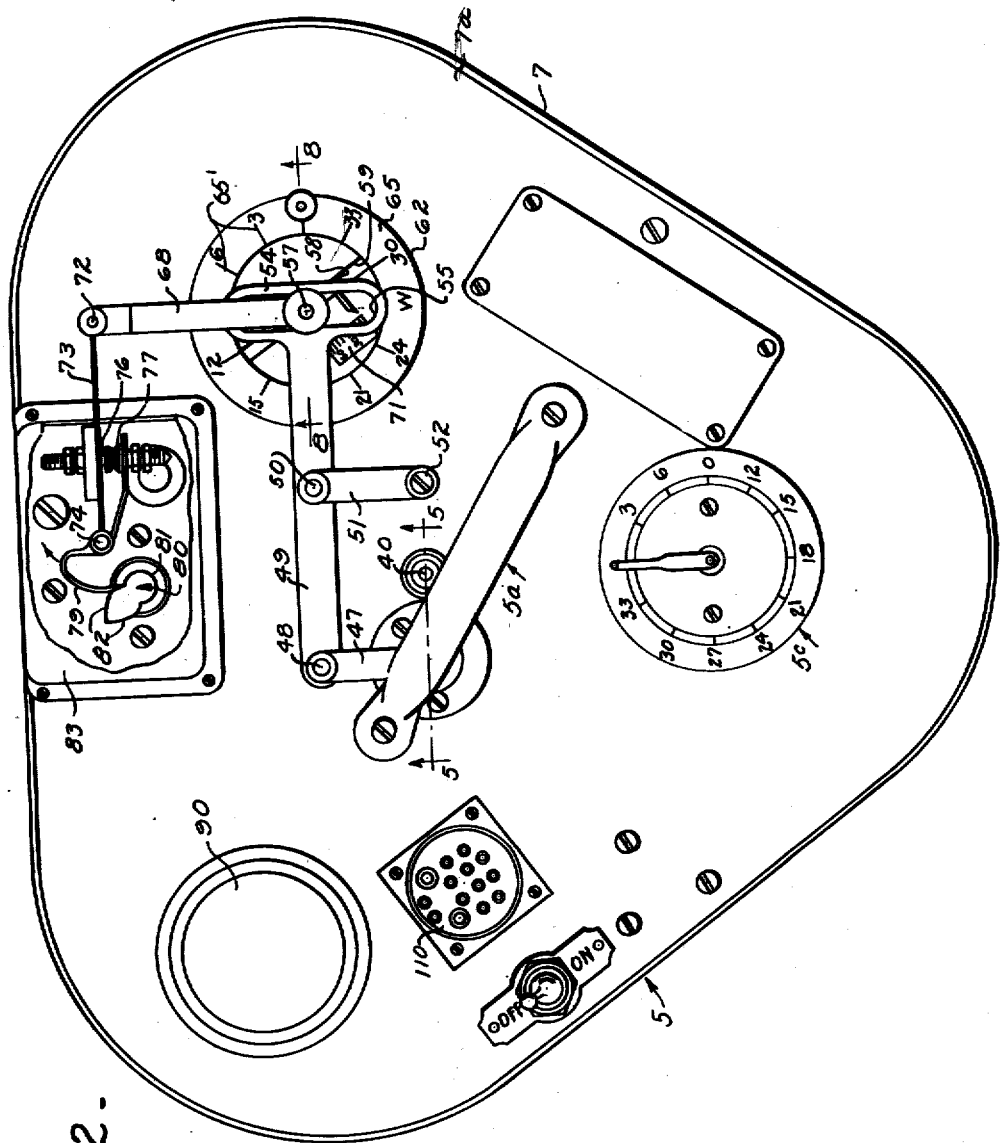
Fig. 2 is a top plan view of the recorder of the assembly of Fig. 1.

Referring now to Fig. 1 the reference numeral 1 generally indicates an aviation ground trainer generally of the type disclosed in U. S. Patents 1,825,462 and 2,099,857, granted to Edwin A. Link, and comprising a fuselage 2 forming a cockpit enclosure for the student and tiltably and rotatably mounted on a base 3 and the cockpit being provided with controls similar to those of an aircraft whereby the student can control pneumatic motor means which are effective to cause a change in attitude of the trainer fuselage as well as to change its azimuth heading. The student can thus control the trainer in a manner similar to the control of the flight attitude and directional heading of an actual aircraft. Change in heading of the trainer is transmitted by means of an "Autosyn" transmitter 4 in the trainer base to a corresponding Autosyn receiver mounted on a course recorder 5 which is effective to change the directional heading of the recorder an amount equal to the change in trainer heading. The course recorder 5 consists of a wheeled carriage propelled by small synchronous motors so that the speed of translation of the carriage is proportional in a particular scale to the assumed flight velocity of the trainer. The recorder is adapted to leave a trace of the assumed flight course on a chart C mounted on table 6. The general construction of the course recorder is similar to that disclosed in U. S. Patent No. 2,179,663, and per se forms no part of my invention and such parts as a carrying handle structure and azimuth heading indicator structures generally indicated respectively at 5a, 5b, and 5c forming part of the recorder as commercially supplied will not be further described as they have no bearing on the invention. The present invention relates to means for altering the heading and translational velocity of the course recorder to introduce the effect of an assumed wind and the constructional features whereby this result is obtained will now be described.

Figure 3:
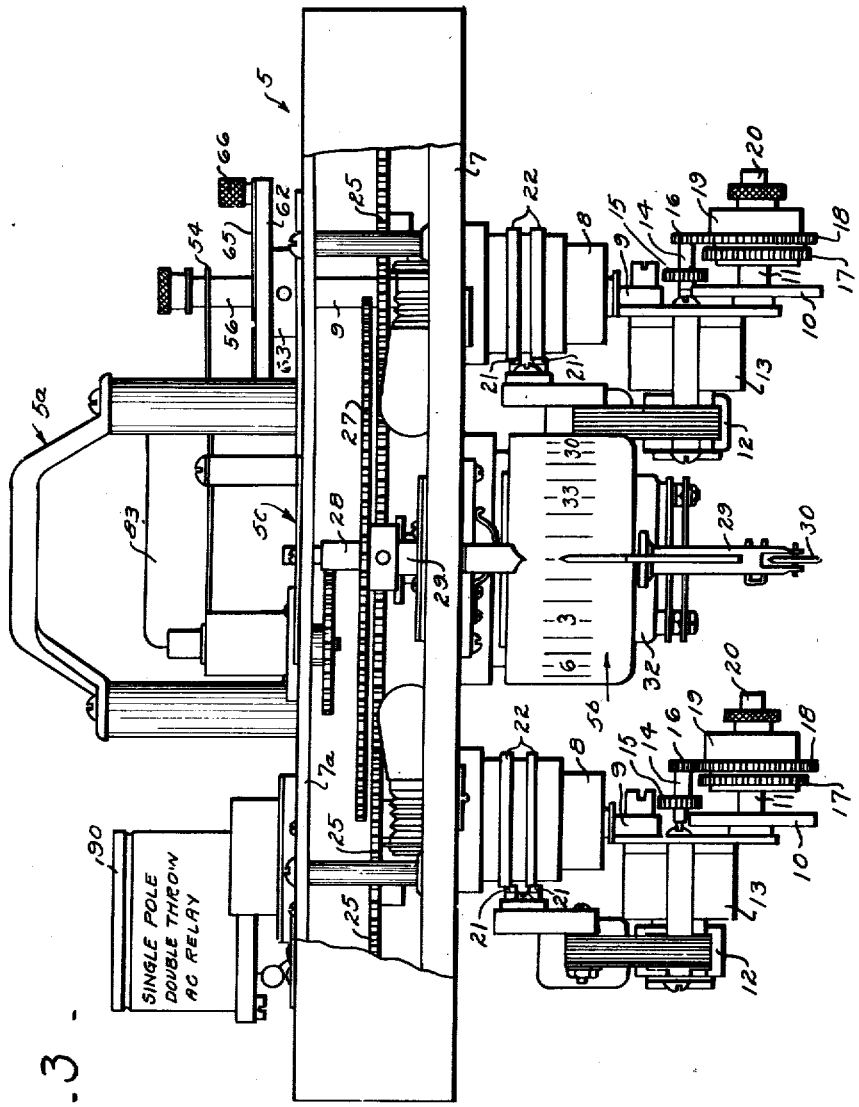
Fig. 3 is a front elevation of the recorder of Fig. 1.

Referring now to Figs. 3 and 4, the course recorder generally indicated by the reference numeral 5 is seen to comprise a lower triangular base or frame member 7 and an upper base or frame member 7a, which frame members are held in spaced relation by means of screws and spacer sleeves. The lower frame member serves as a support for a pair of bearing bosses 8 in which a pair of downwardly extending shafts 9 are rotatably journalled in bearings not shown. A motor supporting frame is secured by screws or the like to the lower ends of the shafts 9 and which serve as supports for the respective rollers 10, the rollers being provided with driving shafts 11. A small synchronous electric motor 12 is provided for driving each roller 10 and each motor is provided with a reduction gear drive 13, adapted to drive a shaft 14, having mounted thereon two gears 15 and 16, respectively, which are adapted to mesh with gears 17 and 18 respectively mounted on a sleeve 19 which in turn is slidably keyed to the roller driving shaft 11 and adapted by means of a detent device 20 to be moved axially and locked so that either of two drive ratios is available for driving the shaft 11 and roller 10 from the motor 12.

Each electric motor 12 is supplied with alternating current by means of brushes 21 which engage slip rings 22 mounted on the bearing housings 8, and the slip rings being electrically connected to an outlet plug on the recorder frame whereby current from an external source may be led in to drive the motors 12, and rollers 10 may be rotated with the shafts 9 about their axes while the motors continue to apply propulsive power to the respective rollers 10. Each of the shafts 9 adjacent its upper end is provided with a gear 25 and meshes with a gear 26 (see Fig. 4) whereby turning movements of the gear 26 causes equal angular rotation of the gears 25 to thereby change the directional heading of the rollers 10. A third gear 27 meshes with the gear 26 and the gears 25 and 27 being of equal diameter, all will partake of an equal angular movement due to rotation of the gear 26. The gear 27 is mounted on a vertically depending shaft 28 which is suitably rotatably mounted in a bearing 29 secured to the frame member 7 and is provided at its lower end with a small roller 30 which, when inked, serves as a means for recording the course of the recorder 5 on the chart C of Fig. 1. The structure so far described is conventional and similar to the recorder illustrated and described in Link Patent No. 2,179,663 previously referred to.

The synchronous electric receiver 32 which is adapted to be electrically connected to the transmitter 4 of Fig. 1 is mounted on the underside of the frame member 7 and in the conventional recorder as heretofore employed in the art has been directly connected to the gear 26 for transmitting changes of heading of the ground trainer through the gears 25 and 27 to the rollers 10 and marker wheel 30. In accordance with the present invention, however, the gear 26 (see Fig. 4) is adapted to be driven by the output member of a two-way drive differential, generally indicated by the reference numeral 35, one input drive of which is connected to the rotor shaft of the receiver 32, and a second input shaft of the differential being connected to a wind drift computing mechanism which will be later described, the gear 26 being operable in accordance with the algebraic sum of the angular rotations of the input members of the differential to alter the heading of the course recorder.

By reference to Fig. 5 the receiver 32 has its output or rotor shaft 33 connected by a screw driver type of drive to a shaft 34 of the differential 35, the shaft 34 having mounted thereon a gear 36 forming one of the side gears of a known type of differential (see also Fig. 6). The other side gear 37 of the differential is secured to the gear 26. A pair of planetary pinion gears 38 (see Fig. 6) which mesh with each other, respectively mesh with the side gears 36 and 37 and the gears 38 being rotatably supported in a differential carrier frame 39 which is keyed to a shaft 40. As seen in Fig. 5 the upper end of the shaft 40 is journalled in bearings carried by the upper frame member 7a and has a gear 42 mounted thereon which meshes with a gear 43 which is secured to the lower end of a vertical shaft 44, which in turn is rotatably supported in bearings 45 carried in a suitable supporting housing secured to the upper side of the frame member 7a. At its upper end the shaft 44 has secured thereon a boss 46 formed integral with a lever 47 which is adapted to be rotated by a second lever 49 pivotally connected thereto by pivot pin 48.

It will be understood by reference to Figs. 4 and 5 that rotation of the shaft 33 will cause rotation of the input member 34 and gear 36 of the differential 35, and if it be assumed that shaft 40 is held fixed, the gear 26 will be rotated in response to the rotation of the shaft 33 so that the change in heading of the rollers 10 and 30 (Figs. 3 and 4) will be solely influenced by the change in heading of the trainer, and by suitable choice of gear ratios the change in heading of the recorder will be exactly equal to the change in heading of the trainer in the same manner as in the conventional ground training apparatus, such as illustrated in the previously noted patents. If, however, the lever 47 is rotated so as to cause rotation of the shaft 44 in either direction, the differential carrier pinions 38 will rotate with the carrier 39 due to rotation of shaft 40 by gears 43 and 42, and if input shaft 34 is assumed to be stationary, gear 26 will be rotated due to rotation of lever 47, and accordingly it is possible to superimpose a change in heading on the recorder 5 apart from that due to change in heading of the trainer transmitted through the receiver 32. By means of the above described construction, the differential 35 forms a means to add or subtract drift angle from the heading imparted to the course recorder through receiver 32 and if the lever 47 is moved in accordance with the drift angle the heading of the course recorder will properly include drift to simulate the effect of an assumed wind.

Figure 8:
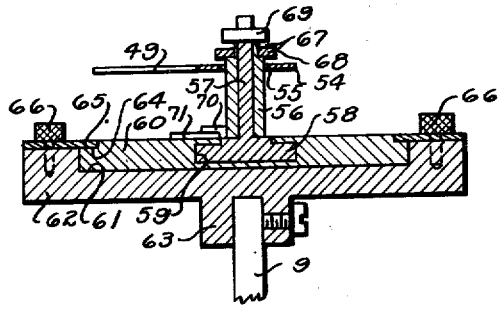
Fig. 8 is a sectional view taken on line 8—8 of Fig. 2 illustrating the details of the wind setting means.

In order to move the lever 47 from a neutral position in either direction to introduce drift angle into the heading of the course recorder, a structure is provided for computing drift angle as well as ground speed and track, which structure is best illustrated in Fig. 2. Referring to Fig. 2, the lever 47 is pivotally connected to the outer end of lever 49 as previously noted with respect to Fig. 5 and the lever 49 is supported by means of a link 51 pivoted to the lever 49 midway between its ends as indicated at 90, the link being pivotally supported by means of a pivot 52 secured to the upper frame member 7a. Movement of the lever 49 will thus cause drift angle settings to be introduced into the course recorder heading through the lever 47 and differential 35 as previously described with reference to Fig. 5. At its outer end the lever 49 is provided with an enlarged head portion 54 which is slotted as at 55 to provide a conventional Scotch yoke mechanism. The yoke 59 is slidable relative to a bearing sleeve 56 (see Fig. 8) which is supported by an upright threaded stem 57 which is formed integral with a crosshead made in the form of a T-bolt head 58 which is slidable in a T-shaped slot 59 formed in a circular disc member 60. The disc member 60 is fitted and rotatable in an annular recess 61 formed in a circular head member 62 which is secured by means of a boss 63 to the upper end of one of the shafts 9 adapted to cause steering movement of the rollers 10 (see Fig. 3).

Again referring to Fig. 8, the member 60 is provided with a recessed circular flange 64 and is held in fixed relation to the head 69 by means of a circular disc 65 secured to the head member 62 by means of clamping screws 66 which may be released to allow rotation of the disc 60 relative to the head 62. The upper end of the sleeve member 56 is formed with a reduced diameter portion 67 which serves as a bearing for the inner end of a link 68, and the outer end of the stem 57 is threaded to receive a clamping nut 69 which when released allows the crosshead 58 to be slid backward and forward in the T slot 59 and when tightened holds the crosshead 58 in fixed position relative to the center of disc 60 and also retains the link 68 in assembled position. An indicator pointer 70 is formed integral with the crosshead 58 and extends laterally to overlie a portion of the disc 60 to indicate the adjusted setting of the crosshead relative to the center of the disc 60 by means of a suitable scale 71 affixed to or engraved upon the upper surface of the disc 60 in parallel relation with the T slot 59, the scale 71 being graduated in terms of wind velocity.

It will be apparent by reference to Fig. 2 that if the nut 69 is loosened, the crosshead 58 may be moved in the T slot 59 so that the center of stem 57 may be moved eccentric to the center of rotation of the disc 60 and the radial distance of the center of stem 57 with respect to the center of disc 60 as measured on scale 71 serves as a means to introduce the wind vector into the problem. By rotation of the disc 60, relative to the head 62, the direction of the relative wind that may be set by adjusting the plane of the T slot 59 with respect to a compass rose scale indicated by reference numeral 65' and marked on the upper surface of the clamping disc 65 in Fig. 2, it is thus possible to set in both wind velocity and heading into the computing mechanism. If the disc 60 is clamped in affixed position relative to the head 62 by means of the clamping screws 66, stem 57 and sleeve 56 previously described with reference to Fig. 8 will be moved off center and yoke member 54 will be shifted axially to the right or left depending upon the direction of rotation of the pin 57 which acts as a crankpin. As the head 62 is rotated in accordance with changes in heading of the course recorder due to its connection to one of the shafts 9, as previously noted, the yoke member 54 will move axially, and through motion of the lever 47 introduce the correction for drift into the heading of the course recorder through the differential 35 as explained with reference to Fig. 5.

Again as noted in Fig. 2 the link 68 is pivotally connected at its outer end as indicated at 72 to the outer end of a flexible link member 73 which is pivotally mounted at its inner end on a pivot stem 74, which also serves as a means for supporting a contact biasing torsion spring 75 shown in Fig. 4. An insulated contact 76 is mounted on the link 73 and is angularly movable therewith about the pivot 74 and a cooperating contact 77 is mounted on the outer end of a lever 78 which is also pivotally supported on the pivot pin 74 and is urged by torsion spring 75 in a direction such as to normally cause engagement of contacts 76 and 77. A curved cam follower portion 79 integrally formed with the contact lever 78 extends beyond the pivot 74 and serves to transmit motion from a cam, generally indicated by the reference numeral 80, to the contact arm 78 to cause disengagement of contacts 76 and 77. The cam 80 has a circular arc portion 81 joined by flank portions 82 symmetrically disposed on either side of the center line of the cam, the flank portions being designed as constant acceleration cam forms for a purpose later to be described.

The cam 80 of Fig. 2, as seen in Fig. 4, is mounted on the upper end of a shaft 84 which is rotatably journalled in suitable bearings by the upper frame member 7a and is connected to a vertically extending shaft 85 which is journalled in the lower frame member 7 and is provided with a worm gear 86 at its lower end which meshes with a worm 87 which is secured to a shaft 88 which forms the armature shaft of a synchronous electric motor 89. The details of the motor mounting and gearing will also be made clear by reference to Fig. 7. The motor 89 is adapted to be run at a constant speed from a suitable source of alternating current, and through the gearing 86—87 drives shafts 85 and 84 at a speed of approximately 100 R. P. M. so that cam 80 is rotated at a like speed.

Figure 9:
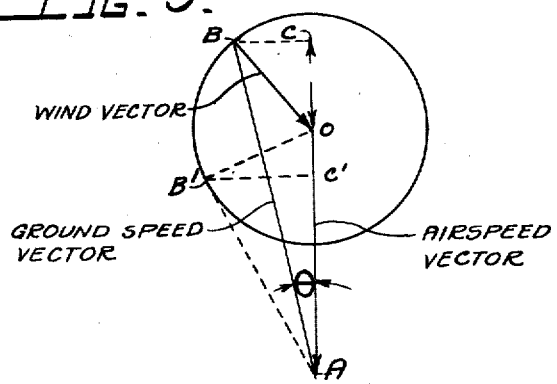
Fig. 9 is a diagrammatic illustration of the theory of the wind drift computing mechanism.

The link member 49 as previously noted, serves as a means to introduce wind drift angle into the heading of the course recorder over and above the heading imparted thereto from the trainer; and the link 68, and contact breaker mechanism including contacts 76 and 77 and cam 80 forming means for varying the speed of translation of the course recorder over its supporting surface as a function of ground speed, which combined functions of the computer mechanism will now be described. By reference to Figs. 2 and 9 it will be seen that if the crosshead 58 be moved upward from the position as shown in Fig. 2 until the pointer 70 is opposite the numeral on the wind scale 71, and the nut 69 then tightened and the disc 60 is rotated relative to the head 62 and wind scale clamping plate 65, the yoke 54 will be moved axially to the left causing a corresponding movement of the link 49 and lever 47 which through the differential 35 will cause a change in heading of the rollers 10 and 30 through movement of the gear 26 as previously explained, and by this means it becomes possible to introduce the angular relation between any assumed wind and the assumed heading of the course recorder such that the actual heading of the course recorder rollers 10 and 30 will be changed from an initial heading such as corresponds to the air speed vector OA (see Fig. 9)

through the angle theta or drift angle, to correspond with a heading coincidence with the ground speed vector A—B illustrated in Fig. 9. If the disc 60 (Fig. 2) is then clamped for rotation with the head 62, changes in heading of the course recorder due to changes in heading of the trainer will cause angular rotation of the stem 57 and sleeve 56 which act as a crankpin as noted with respect to Fig. 8, and cause movement of the yoke 54 and levers 49 and 47 to alter the heading of the course recorder rollers in accordance with the change in the heading of the trainer with respect to the assumed wind. This function will be made more clear by reference to Fig. 9, in which instead of the heading of the trainer being changed, it is assumed that the heading of the course recorder remains constant as indicated by the airspeed vector OA. If we assume that the vector OA or airspeed vector remains fixed in space, we may rotate the wind vector OB about the center O through 360° and for all purposes accomplish the same result as if the vector OB were retained constant in magnitude and direction and vector OA rotated through 360° relative to the wind. In the diagram of Fig. 9, if the direction of the wind or vector OB corresponds to the angular setting of the slot 59 (see Fig. 2), the line A—B represents the closing side of a wind triangle such that the length of the line A—B represents to some particular scale the ground speed of the assumed flight of the trainer and the angle theta represents the drift angle, or that angle through which if the airplanes heading corresponded to that of the air speed vector, the aircraft would be drifted due to the effect of wind vector OB. In accordance with the present invention, if means were provided for measuring angle theta and lever 47 (Fig. 2) were rotated proportional to the said angle theta, the drift angle could be introduced into the heading of the recorder and hence would satisfactorily reproduce in the record made by the recorder, the effect of the heading of assumed wind. It will be noted by reference to Fig. 9 that the dotted line B—C which when divided by the ground speed vector is the sine of angle theta and can be employed as a measure of the angle theta since for small angles the value of the sine of the angle is proportional to the angle expressed in radians. The length of the projection B—C can be employed as a measure of the angle theta and this projection B—C will equal the horizontal movement of the yoke 54 and the movement of the yoke in either direction from a neutral position corresponding to alignment of vectors OA and OB will either add or subtract an angular displacement through differential 35 to the heading of the course recorder and thus change the recorder's heading to correspond with the ground track or ground speed vector A—B of Fig. 9. It will be seen by reference to Fig. 9 that rotation of point B through 360°, which in effect is the same as rotation of vector OA relative to OB when the latter is considered constant, will cause the projection B—C to vary from zero to a maximum such as at OB' on either side of the neutral position so that the wind drift angle is automatically computed by the horizontal shift of yoke 54 regardless of the change in heading of the course recorder with respect to the assumed wind, and therefore the movement of the lever 47 correctly introduces drift angle into the heading of the recorder.

Again referring to Fig. 9, the projection OC of the point B on the axis of the airspeed vector, if algebraically added to the length of the airspeed vector OA, will be seen to substantially equal the length of the ground speed vector A—B, although this assumption does introduce some error which at its maximum amounts to about 7%. It so happens that the angular movement of link 68 (see Fig. 2) is such as to offset the error of this assumption so that the maximum net error has been found not to exceed approximately 2%. It, therefore, becomes possible to compute ground speed by means of the crosshead 58, disc 60, and sleeve 56 and link 68 since the displacement of link 68 will be proportional to the projection OC in Fig. 9 and hence the movement of lever 73 in Fig. 2 will be in accordance with or as a function of OC in Fig. 9 which when algebraically added to the constant assumed airspeed vector will give ground speed.

In the structure as illustrated in Fig. 2, if the cam 80 is assumed to be rotating at a constant speed and the recorder driving motors 12 are assumed to be supplied with alternating current such that the motors would normally drive the recorder at a speed equal to in a reduced scale to a ground speed of 220 miles per hour, and if it be assumed that airspeed is constant at 160 miles per hour and the wind velocity were 60 miles per hour, when the wind and airspeed combined to be additive such as flying with a tail wind, the maximum velocity would equal 220 miles per hour, and under such conditions the contacts 76 and 77 will remain closed so as to continuously supply current to the driving motors 12. If now, in order to obtain any ground speed between a condition of no wind and a condition of a head wind with respect to the course recorder is assumed, we interrupt the supply of current to the driving motors so that the ratio of the time of contact opening to contact closure equals the ratio of calculated ground speed to maximum ground speed, the average velocity of the recorder would be substantially equal to the calculated ground speed, and this result is accomplished as follows. As the lever 73 is shifted by link 68 (Fig. 2), contact 76 is moved closer to or away from contact 77 and the torsion spring 75 acting on the contact arm 78 maintains contacts 76 and 77 in engagement. If now the cam 80 engages cam follower 79 for a duration of time depending on the ratio of assumed ground speed to maximum ground speed, the cam 80 will cause an interruption of the supply of current through openings of contacts 76 and 77 to vary the speed of the course recorder, and this operation will now be explained for three conditions in which all velocities will be expressed in miles per hour which are reproduced in the motion of the recorder to a greatly reduced scale.

Figure 10:
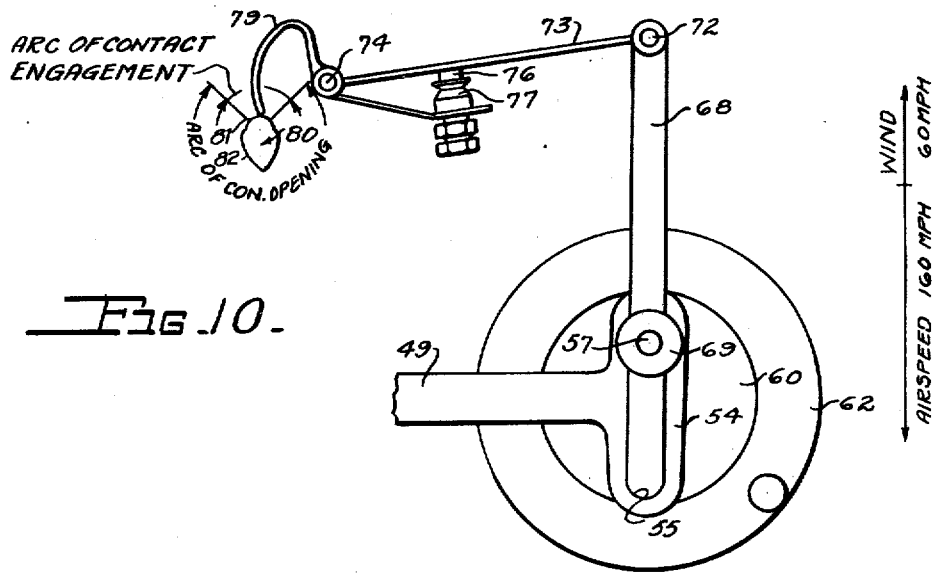
Fig. 10 is a view illustrating the functioning of the contact breaker mechanism when the direction of the assumed wind is opposite the heading of the trainer and recorder.

The first condition if assumed with a wind of 60 miles per hour and an airspeed of 160 miles per hour and that the wind becomes a head wind, then the link 68 will be shifted upward from the position as shown in Fig. 2 to the position as shown in Fig. 10 such that the contacts 76 and 77 remain in engagement through an arc of contact equal to .454 of one revolution of cam 80, since the wind and airspeed vectors being in alignment and in opposition, the ground speed under these conditions will equal $$160-60=100 \ M.\ P.\ H.=100/220$$

or .454 times the maximum velocity of the recorder. Hence the contacts remain closed only during .454 times the time of one revolution of contact 80, and hence the average speed of the course recorder is reduced until its scale speed equals 100 miles per hour.

For a second condition in which it is assumed there is no wind, the crosshead 50 and links 40 and 60 will be in the position as illustrated in Fig. 2. The ground speed should then equal the assumed constant scale airspeed of 160 miles per hour so that the time of contact closure should equal the ratio of 160 to 220 or .727 of the time of one revolution of cam 80 which will then reduce the scale speed of translation of the recorder from a scale maximum of 220 miles per hour to the desired scale value of 160 miles per hour.

Figure 11:
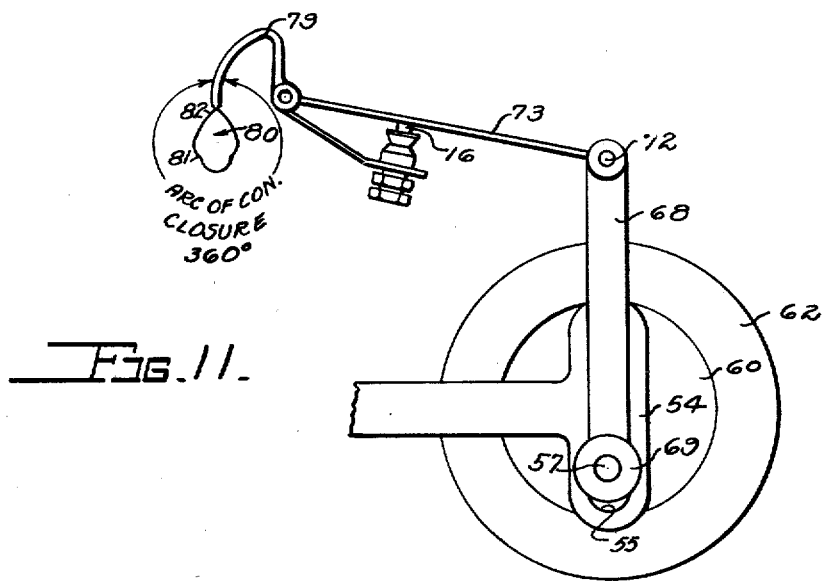
Fig. 11 is a view similar to Fig. 10 showing the functioning of the contact breaker when the assumed wind is a tail wind.

Similarly for the third condition, if we assume the wind and airspeed to coincide in direction such that the ground speed will equal 160+60 or 220 M. P. H., then the parts will be in a position substantially as shown in Fig. 11 in which the lever 68 will be moved downward from the position as shown in Fig. 2 and the cam follower 79 will be just out of contact with cam 80 and contacts 76 and 77 will remain in engagement continuously, thus there will be no interruption of current to the driving motors 12 of the course recorder and the same will run at a scale velocity proportional to a ground speed of 220 M. P. H.

For any condition between the conditions as above described, the position of the lever 68 will, shifted from the position of Fig. 2 an amount such that its displacement algebraically added to a fixed displacement proportional to the assumed scale airspeed of 160 miles per hour, be proportional to the ground speed as derived by the computing mechanism, as explained with reference to Fig. 9, such that cam follower 79 will remain in engagement with cam 80 for a duration of time equal to the computed value of the ground speed to the maximum ground speed and hence the scale velocity of the course recorder will be proportional to the computed value of ground speed. The design criterion of the cam 80 is such that for any computed ground speed the point of opening and closing of the contacts 76 and 77 will be known as well as the position of the cam follower 79 at the beginning of contact opening. The cam shape between points of opening and closing of contacts 76 and 77 for each position of lever 73 can then be determined such, that the arc of contact will give the desired ground speed; that is, the ratio of the time the current is on to the condition where current is supplied continuously will give an average speed equal to the ground speed. The shape of the cam 80 to satisfy this criterion is such that the flanks 82 (Fig. 1) take the form of a constant acceleration cam which normally would be heart-shaped, but which is provided with a circular arc portion 81 as seen in Fig. 2 because no substantial error is introduced thereby.

Figure 12:
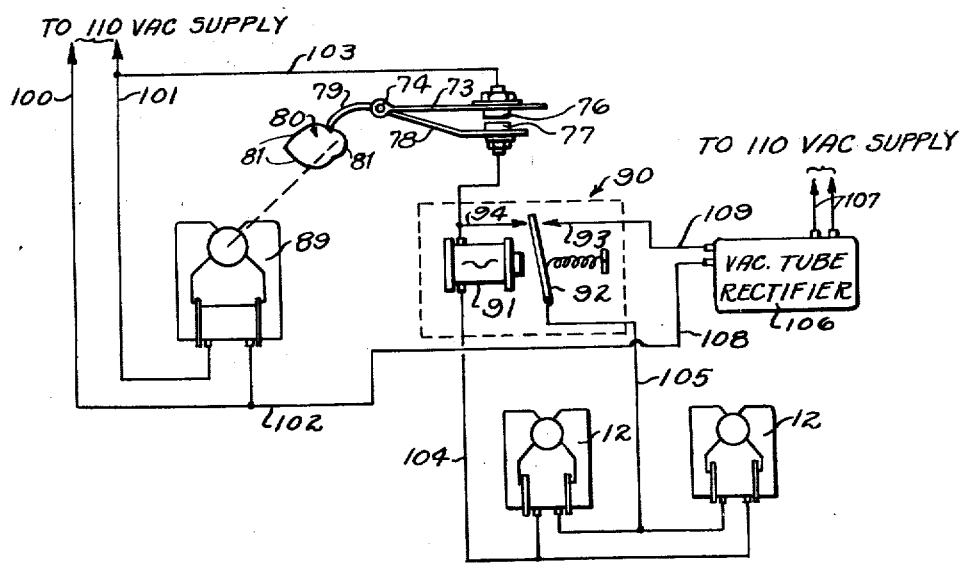
Fig. 12 is a schematic wiring diagram of the components of the invention.

The contact points 76 and 77 are electrically connected in circuit with the driving motors 12 (Figs. 3 and 4) as illustrated in Fig. 12. As seen in this figure conductors 100 and 101 are adapted to be connected to a convenient source of alternating current through a suitable plug connection such as indicated at 110 in Fig. 2 and these leads are directly connected to motor 89 which drives cam 80 continuously.

A relay 90 generally indicated in Fig. 2, and schematically illustrated by the enclosure within dotted lines in Fig. 12 has its solenoid coil 91 connected in series with contact points 76 and 77 and connected across the conductors 101 by means of leads 102 and 103 so that when contacts 76 and 77 are closed, relay coil 91 will be energized to attract an armature 92 to engage a back contact 94 and when contacts 76 and 77 are open, the relay armature will be returned by a suitable yielding means to engage a front contact 93. The driving motors 12 for the course recorder are connected in parallel with each other and having one side of the parallel motor connections grounded by means of conductor 104 to the alternating current conductor 102 and having the other side of the parallel motor connections connected by means of a conductor 105 to relay armature 92. Back relay contact 94 is connected to line 103 through contacts 76 and 77 so that when relay armature engages contact 94, motors 12 will be connected in parallel to the alternating current supply from conductors 100 and 101. An alternating current rectifier of the vacuum tube type indicated by reference numeral 106 is adapted to be connected by means of conductors 107 to the alternating current supply and the direct current output of rectifier 106, which may be selected from 15 to 90 volts as desired, is grounded to one side of the alternating current circuit by conductor 108 which is connected to conductor 102. The other side of the direct current output of the rectifier 106 is connected by means of conductor 109 to the front contact 93 of relay 90. The operation of the device is as follows: When lever 73 is shifted upward or downward to shift contact 76 in accordance with the desired ground speed relation as previously described, cam 80 driven at constant speed by motor 89, through cam follower 79 causes the normal engagement contacts 76 and 77 to be interrupted which de-energizes solenoid coil 91 and disconnects motors 12 from the alternating current supply, and at the same time the motors 12 will then be connected in parallel by means of relay armature 92 and front contact 93 to the direct current output of rectifier 106 so that direct current will be applied to the recorder driving motors 12 to thereby dynamically break the same and prevent forward movement of the recorder during the time that contacts 76 and 77 are open. This feature of applying dynamic breaking has been found necessary in order to prevent coasting of the recorder after the alternating current supply to the driving motors 12 is interrupted. When contacts 76 and 77 are closed the relay armature 92 is attracted by solenoid 91 to engage the relay armature with back contact 94 which places the motors 12 in circuit with the alternating current supply so that they will rotate at a constant speed until contacts 76 and 77 are again opened. By varying the duration of contact opening in the manner as previously described, it is possible to cause motors 12 to run for time durations such that the average velocity of the recorder equals the desired ground speed. Since the rotation of cam 80 is at a rate of 100 R. P. M., there will be 100 interruptions per minute of current to the driving motors 12 so that the actual interval between drive periods are short resulting in an effect much the same as if the speed of driving motors 12 were actually varied. The current interruption scheme is employed because it is more simple than to attempt to vary the frequency of the current supply to motors 12, because the motors of the character employed on course recorders will not respond instantly to changes in frequency and hence some error would be introduced by employing a frequency change scheme in apparatus now in use.

It is thus seen by means of the invention that it is possible by means of differential 35 to introduce drift angle into the heading of the recorder and to change the recorder's velocity by the current interrupter scheme so that the same duplicates the computed assumed ground speed of the trainer and that the ground speed and wind drift for each particular heading of the trainer is automatically computed by the structure shown in Fig. 2 and previously described, without intervention by the instructor. By employing the speed change mechanism described with reference to Fig. 3 it is possible to vary the air speed for two assumed values. In this respect, however, it should be noted that variation in the air speed will alter the range of the assumed wind velocity from that as shown on the scale 71 which of course would necessarily have to be taken into consideration in the conduct of a problem. From actual tests of a device constructed in accordance with the invention, the maximum error introduced in the computing of ground speed has been found to not exceed about 2% with a similar maximum error in heading of the course recorder from the computed heading and the mechanism operates well within the limits of accuracy required in the solution of problems. It should be understood that other forms of contact breaker mechanism may be employed in lieu of that herein illustrated and described providing that the contact duration be proportional to the ratio of ground speed to maximum speed for which the course recorder motors will drive the recorder under tail wind conditions. It is also obvious that the computing mechanism herein shown might be located other than on the course recorder provided the various functions such as trainer heading were imparted to it through remote control devices and the recorder heading were similarly changed by the computing mechanism through a remote control interconnecting the differential 35 with the computing mechanism. Having now described my invention, it will be apparent that many changes may be made therein which will become apparent to those skilled in the art as falling within the scope of the invention as defined in the appended claims.

I claim:

1. A wind simulating device for aviation ground trainers of the character wherein a power propelled course recorder is directionally controlled by the trainer though the medium of an electrical remote motion transmission including a transmitter actuated by the rotation in azimuth of the trainer and a receiver associated with the recorder for directionally controlling the same, comprising in combination with said motion transmission, steering means for directionally controlling said recorder, a differential having an output drive and two input drives, a connection between said output drive and said recorder steering means, a connection between said motion transmission receiver and one of the input drives of said differential, wind drift computing mechanism associated with said recorder steering means and operative automatically to compute the drift angle for an assumed wind of given velocity and heading with respect to an assumed airspeed vector having a direction corresponding to the heading of said trainer, an element positioned by said computing mechanism in accordance with said drift angle, and a connection between the other of said differential input drives and said element, whereby the output drive of said differential causes the said recorder steering means to be positioned in accordance with the algebraic sum of the angular rotations of said input drives.

2. The structure as claimed in claim 1, in which said computer mechanism is mounted on said course recorder.

3. The structure as claimed in claim 1, in which said course recorder is propelled by electric motor means and in which circuit breaking means are provided in the supply to said electric motor means, and means associated with said computing means and controlled thereby in accordance with the value of ground speed for controlling said circuit breaking means whereby the duration of supply of current to said electric motor means is proportional to the computed ground speed.

4. Means for introducing a simulated wind effect in aviation ground training apparatus in which a recorder is propelled by electric motor means over a reference chart and remotely directionally controlled to thereby simulate the flight course of an assumed aircraft, the combination with said recorder of steering means for controlling the directional heading of the recorder, a differential mounted on said recorder and having an output drive and a pair of input drives, a remote motion transmitting means for directionally controlling the heading of said recorder, a connection between said motion transmitting means and one of the input drives of said differential, means mounted on said recorder forming a wind triangle computer including means settable in accordance with the direction and scale velocity of an assumed wind, a connection between said settable means and said recorder steering means, means movable by said settable means in accordance with the instant value of the drift angle of the assumed wind, and a connection between the other of said differential input drives and said last-named means whereby the output drive of said differential positions said recorder steering mechanism in accordance with the algebraic sum of the heading imparted through said motion transmission and the computed value of the drift angle.

5. The structure as claimed in claim 4 in which the electric motor means for driving said recorder when continuously supplied with current are adapted to propel said recorder at a scale velocity equal to the sum of an assumed scale airspeed and an assumed wind velocity, circuit breaking means for interrupting said current supplied to the electric motor means for driving said recorder, means shiftable by said settable means in accordance with the ground speed vector of the assumed wind triangle and means interconnecting said circuit breaking means and said last-named means shiftable by said settable means for controlling the time duration of the interruption of the current to the electric motor means, whereby the recorder is propelled at a speed equal to the scale ground speed.

6. In a course indicator for aviation ground instruction devices of the character in which said course indicator comprises a carriage having steerable rollers and electric power means for driving said rollers to propel said carriage over a reference chart to simulate the flight course of an assumed aircraft, the combination of steering means for simultaneously changing the heading of said rollers, a differential mounted on said recorder and having two input drives and an output drive rotatable in accordance with the algebraic sum of the angular rotations of said input drives, an operative connection between the output drive of said differential and said steering means, a disc rotatably mounted on said recorder, means rotatably interconnecting said disc and said steering means, a crankpin angularly and radially shiftably mounted on said disc such that said crankpin may be angularly set in accordance with the direction of an assumed wind and radially set in accordance with the scale velocity of said assumed wind with respect to assumed scale airspeed, a link shiftable in either direction from a neutral position in accordance with the angular rotation of said crank, and a connection between said link and the other of said differential input drives to cause an angular displacement of said input drive in proportion to the magnitude and sense of the displacement of said link.

7. The structure as claimed in claim 6, in which a second link is provided for actuation by said crankpin such that said second link is displaced in either direction from a neutral position by rotation of said crankpin by said recorder steering mechanism, the plane of movement of said second link being substantially at right angles to the plane of movement of said first-named link, a contact breaker mechanism including one contact movable by said second link relative to a second contact, means for normally causing engagement of said contacts, a constant acceleration cam mounted on said recorder and driven at a constant speed, a cam follower adapted to engage the cam to move said second contact in an opening direction with respect to said one contact and the movement of said one contact varying the point of engagement of said cam follower and cam to thereby vary the duration of circuit interruption through said contacts in proportion to the displacement of said second link, and a power supply circuit including said contacts for supplying energy to the power means for propelling the recorder.

8. Wind drift mechanism for aviation ground training apparatus comprising a course indicator having a frame, power propelled rollers for supporting said course indicator for translational movement, shafts journalled in said frame for supporting said rollers, gearing interconnecting said shafts for simultaneous rotation to effect a change in heading of the recorder, a differential on said frame and having an output shaft for actuating said gearing, a pair of input drives for said differential, a crank disc mounted on one of said roller supporting shafts and rotatable therewith, a crankpin on said disc and angularly and radially adjustable with respect to said disc, means for angularly setting said crankpin with respect to the heading of said course indicator to represent the directional heading of an assumed wind, means for adjusting the throw of said crankpin in accordance with the scale velocity of said assumed wind with respect to an assumed scale airspeed, an element for angularly rotating one of said differential input drives, a link interconnecting said element and said crankpin for, and causing a change in heading of, said course indicator rollers through said differential output member in accordance with the drift angle as computed by the movement of said link, and means associated with the other of said differential input drives for transmitting therethrough to the steerable rollers a change in heading in accordance with the instant heading of an assumed flight of an aircraft.

9. The structure as claimed in claim 8, in which means are mounted on said course indicator associated with the power propulsion means for controlling the speed of translation of said course indicator, control means for said last-named means and actuated by said adjustable crankpin in a plane substantially normal to the plane of movement of said link whereby the translation velocity of said course indicator is varied to equal the scale ground speed for the given assumed constant airspeed and wind conditions.

RAYMOND K. STOUT.